United States Patent Office 2,879,686
Patented Mar. 31, 1959

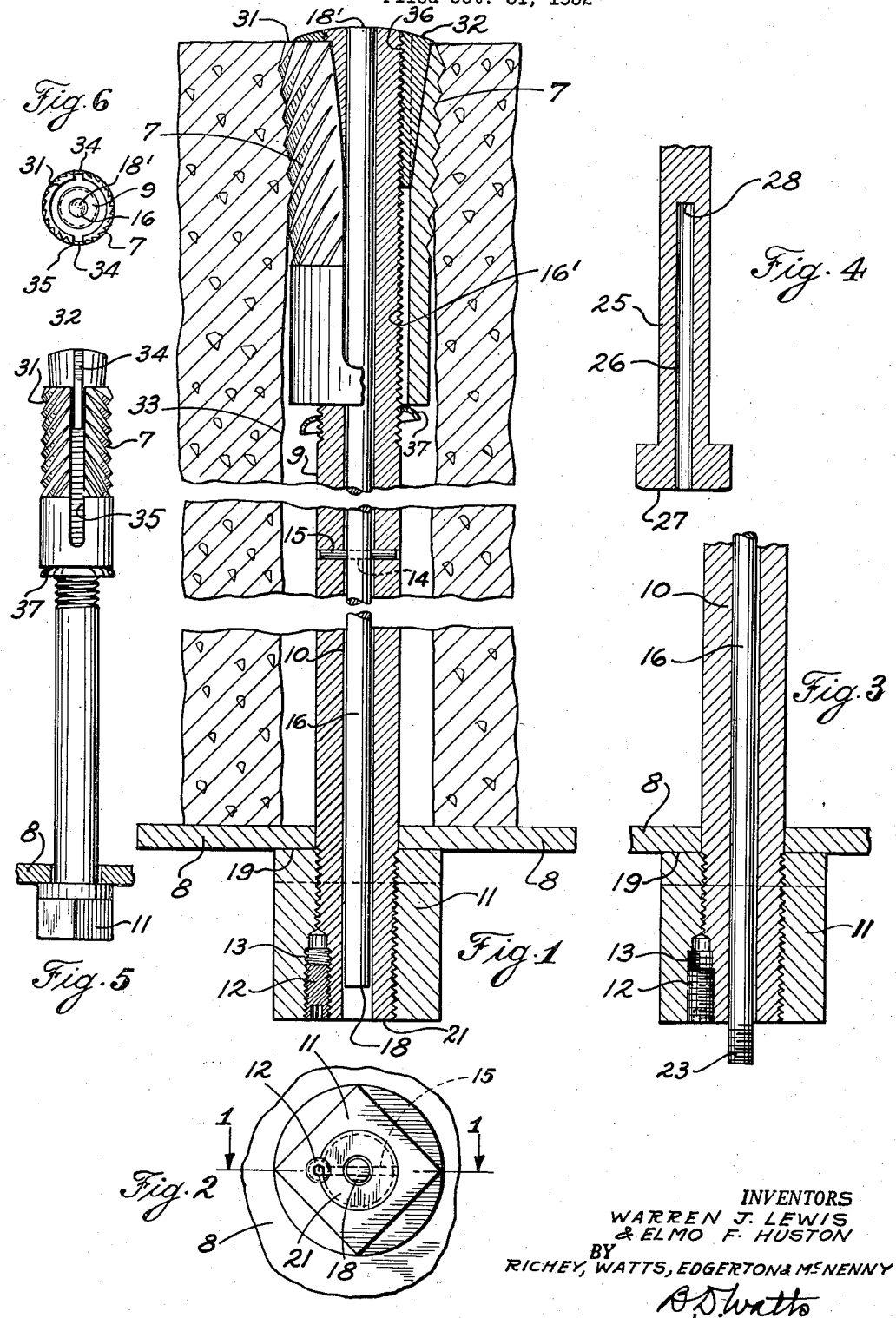

2,879,686

ANCHOR BOLT HAVING TEST ROD TO INDICATE TENSION CHANGES

Warren J. Lewis and Elmo F. Huston, Mansfield, Ohio, assignors to The Ohio Brass Company, Mansfield, Ohio, a corporation of New Jersey Application October 31, 1952, Serial No. 318,016

5 Claims. (Cl. 85—62)

This invention relates to bolt type fasteners having means for determining the tension in the bolt, and more particularly to a bolt for use in applications under circumstances and in locations where it is important to determine the tension in the bolt without removing the bolt from its installed position such as when supporting the roofs of mines.

In many applications it is highly desirable to be able to determine the tension in a bolt while the bolt is in position and under load. To remove the bolt so that the testing device may be substituted is normally difficult and time-consuming and in many ways impossible. In a great many of these applications only the exposed end portion of the bolt is accessible for such measuring and in accordance with the prior art there is no satisfactory or practical way of obtaining the desired information from this exposed portion of the bolt.

One outstanding example of an application wherein the above characteristics are very desirable is to be found in mining operations where bolts are used to support the mine roof supports. Due to the continuous shifting of the roof load on these supports, the load which they carry may change considerably and create hazards resulting from overloading or from inadequate preloading. In such an application it is highly desirable to be able to measure the tension in the roof bolt from time to time and to determine if the load has changed from the installed value or become unduly stressed.

Thus, there has been a long-felt need for a device which enables one to measure the load present, but even though a great deal of work has been done in an effort to solve this problem, all past solutions have been impractical due to a variety of factors such as size and excessive cost in time and money.

A torque-wrench is sometimes used to tighten roof bolts but the torque as indicated by the device is not a true measure of the tension in the bolt. Measurements of tension by means of the torque-wrench and by the herein described method, differ widely due to the friction against the inner face of the head of the bolt and friction in the threads, which materially affect the torque reading, and any dirt between the relative moving surfaces adds to the error of determining tension from torque readings.

It is, therefore, a primary object of this invention to provide a bolt suitable for supports, particularly as for mine roofs, which permits the measurement of loads carried by the bolt or the support without removal of the bolt from its installed position.

It is also an important object of this invention to provide a bolt of this type which compares favorably in size, cost of manufacture, and simplicity with the bolts heretofore employed for the same purpose.

It is still another object of this invention to provide a bolt meeting the foregoing objects and requirements and, in addition, being readily installed in position and being easily tested with conventional means to determine the load to which the bolt is subject at any given moment. The foregoing and other objects and advantages will become apparent in view of the following description taken in conjunction with the drawings, wherein:

Fig. 1 is a longitudinal sectional view of a bolt according to this invention showing the bolt installed in an opening in the roof of a mine;

Fig. 2 is an end view of the bolt showing the structure of the head locking means;

Fig. 3 is a fragmentary, longitudinal sectional view of a modified form of the bolt disclosed in Fig. 1, wherein the rod extends through the exposed end portion of the bolt;

Fig. 4 is a cross sectional view of a modified form of the bolt wherein the head is formed integral with the bolt body;

Fig. 5 is a side elevation showing the bolt of Fig. 1 before installation in the mine roof; and Fig. 6 is an end view of the anchor shown in Fig. 1.

As will be clear from the drawings, in general a bolt of this invention comprises a body formed with a symmetrical opening extending from one end of the bolt, a test portion surrounding said opening and extending longitudinally of the bolt, the body being preferably of substantially uniform thickness and substantially symmetrical shape internally and externally over substantially the entire length of said test portion, and an abutment in the opening removed from said one end a distance at least equal to the distance from said one end to the remote end of said test portion. The abutment may take the form of a restriction such as a pin mounted in the body or the end of the opening.

This structure permits the measurement of the elongation of the test portion at any given time. Since a given load will create a given elongation in the test portion and since the relationship between the load and elongation can be determined at the time of manufacture of the bolt, determination of the elongation of the test portion of the bolt in position permits the determination of the load carried at that instant.

In the preferred embodiment of this invention shown in Fig. 1, the bolt is formed with a tubular body or stud 9 preferably drawn of steel, having a bore 10 therethrough. An internally threaded head element 11 is threaded onto one end of the body 9 to provide means for engaging the plates 8 for engaging and supporting the load carried by the bolt and suitable threads 16' are used to engage the support or anchor 7.

A locking screw 12 is threaded into a bore 13 formed along the inner section of the head element 11 and the body element 9 to prevent any relative motion between these two members. Other locking means may be employed such as spot welding the head to the body. The body in some cases may be as much as three to five feet in length.

A test rod 16 is positioned in the bore 10 in the body or stud 9 and is attached to the body and is secured against axial movement at only one point 14 by any suitable means which point is located below the threads 16'. In the preferred embodiment, a pin 15 has been used to form an abutment to locate the rod; but it would be entirely acceptable to use any other means which prevents relative movement between the rod and body at the point 14. The test rod 16 extends along the bore 10 through that portion of the bore surrounded by the head element 11. In the preferred embodiment (Fig. 1) the end 18 of the rod 16 is located just inside the opening of the bore 10 so that it is protected from possible damage from impacts; however, the end 18' may extend to the other end of the body and be flush therewith. That portion of the body or stud 9 between the point 14 and the loading face 19 of the head element 11 is preferably formed from a drawn tube so that it has a uniform symmetrical cross-section over its entire length and constitutes the test portion. It is preferable that the test portion have a symmetrical cross-section but it is not necessary. Since the rod 16 is not subject to the tension or load carried by the body or stud 9, there is no deformation in the rod as the body 9 assumes its load.

Due to the inherent elasticity of the material of which the body is formed the body or stud 9 will stretch slightly an amount directly proportional to the tension load applied. This stretching will cause the head element 11 and that portion of the body or stud 9 surrounded by the head to move axially away from the point 14 a measurable amount. This, of course, will cause relative movement between the end face 18 of the rod 16 and the end face 21 of the body or stud 9. The amount of this relative movement between the end faces 18 and 21 will be exactly equal to the amount of stretching of the body or stud 9 between the point 14 and the bearing face 19 as a result of the tension in the bolt. Any suitable measuring means, as, for instance, an Ames gauge of the dial indicator type, may be used to determine the relative position of the faces 18 and 21 under no-load conditions and under loaded conditions to determine the change in length of that portion of the body between the points 14 and 19 and thereby the load carried.

As an alternative, as shown in Fig. 3, it would be possible to project the rod 16 beyond the face 21 of the body member and mark the extension 23 with calibrations to give direct readings of the load as shown in Fig. 3.

In the embodiment of this invention disclosed in Fig. 4 the stud or body 25 is formed having an opening or bore 26 which extends from the head end 27 into the body portion 25 and preferably having a uniform symmetrical cross-section and terminating at the point 28 thereby defining a test portion between the point 28 and the face 29 of the integrally formed bolt head. In this embodiment a suitable measuring means capable of measuring the depth of the bore is used to determine the length of the bore or opening 26 under no-load conditions and loaded conditions; the change in length of the test portion betwen the points 28 and 29 determines the load carried.

It is most desirable that the rod and the bolt be formed from material having the same co-efficient of expansion so that the changes in length due to variations in temperatures will not cause any relative movement between the measuring surfaces. Materials having different co-efficients of expansion may be used for the body or stud 9 and for the rod providing correction is made for the difference in the co-efficient of expansion in the two elements.

The anchor 7 is composed of a slotted shell 31 and a tapered expander or plug 32. The outer surface of the slotted shell is formed with a ribbed surface which engages the side of the bore 33 in which the anchor is secured. As the expander 32 is drawn into the end of the shell 31 the shell is expanded into a tight engagement with the wall of the bore 33 preventing any longitudinal motion therebetween. The expander 32 is formed with ribs 34 which fit into the slots 35 in the shell 31 and prevent rotation therebetween. The expander is also provided with a threaded bore 36 into which the stud 9 is threaded.

The anchor 7 is assembled with the shell loosely mounted on the stud and the expander 32 extending from the end of the shell 31 as shown in Fig. 5 is threaded onto the end of the body or stud 9. Mounted on the upper end of the stud 9 is means 37 in the form of a Palnut upon which the lower end of the shell rests during the placing and expanding of the shell 31. The assembled bolt shown in Fig. 5 is positioned in the bore 33 in the wall of the roof of the mine until the plate 8 engages the mine roof and the head 11 engages the plate.

The bore 33 is of a size which engages the rib surface of the shell 31 sufficiently to prevent its rotation when the stud 9 is rotated. The stud 9 is then rotated and the threads on the upper end of the stud draw the expander 32 into the shell 31 thereby expanding the shell into firm and secure contact with the walls of the bore 33. When the stud is restrained from any further rotation through reasonable effort, as will be indicated by experience, the shell will have been forced into firm and secure engagement with the bore 33.

The ribs 34 on the expander engage the edges of the slots 35 in the shell and prevent rotation of the expander as the stud 9 is rotated. The Palnut 37 or other suitable support means prevents the shell from moving axially as the bolt is positioned in the bore and as the expander is drawn into the shell. After the bolt is securely mounted within the bore 33 and if it is desired to bring the tension in the stud to a predetermined value, then the Ames gauge or other suitable means may be applied to determine and adjust the tension as required, the tension being measurable in the manner described.

It should be understood that it is within the scope of this invention to form the head element by methods other than the one described and disclosed such as forging and the like. It would be possible, of course, to manufacture the bolt disclosed by machining the body 9 and the head portion 11 from a single piece of material.

The body 9, head 11 or 27 and the test rod 16 are shown and described as associated with an anchor head 7 comprising an expander shell and expander. Other types of anchor heads may be substituted for that shown, and under suitable conditions the body, head and rod may be used as a support without an anchor head.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. A device for determining the amount of relative movement between two points in an assembly of elements after having been assembled therewith and thereby placed initially in tension which comprises a bolt having a head to bear against one side of that assembly, a shank, and a thread for a nut to bear against another part of the assembly, said bolt having a bore extending through the head and into the shank, a portion of the shank extending from the head, stopping short of the thread and being of uniform cross-section for elongation in direct proportion to increases in tension load imposed on the bolt after its initial installation with said assembly, and a separately-formed, headless test rod secured to the bolt at a place remote from the head in said uniform cross-section shank portion, said test rod being unaffected by elongation of the portion of the shank between the head and said place of attachment and providing a reference for measurement of elongation of the shank between the place of attachment and the head end of the bolt whereby changes of tension loads exerted on the bolt can be determined.

2. A device for determining the amount of relative movement between two points in an assembly of elements after having been assembled therewith and thereby placed initially in tension which comprises a bolt having a head to bear against one side of that assembly, a shank, and a thread for a nut to bear against another part of the assembly, said bolt having a bore extending through the head and into the shank, a portion of the shank extending from the head, stopping short of the thread and being of uniform cross-section for elongation in direct proportion to increases in tension load imposed on the bolt after its initial installation with said assembly, and a separately-formed, headless test rod secured to the bolt only at a place remote from the head in said uniform cross-section shank portion, said test rod terminating within the head and being unaffected by elongation of the portion of the shank between the head and said place of attachment and providing a reference within the bolt for measurement of elongation of the shank between the place of attachment and the head end of the bolt whereby changes of tension loads exerted on the bolt can be determined.

3. A device for determining the amount of relative movement between two points in an assembly of elements after having been assembled therewith and thereby placed initially in tension which comprises a bolt having a head to bear against one side of that assembly, a shank, and a thread for a nut to bear against another part of the assembly, said bolt having a bore extending through the head and into the shank, a portion of the shank extending from the head, stopping short of the thread and being of uniform cross-section for elongation in direct proportion to increases in tension load imposed on the bolt after its initial installation with said assembly, and a separately-formed, headless test rod secured to the bolt at a place remote from the head in said uniform cross-section shank portion, said test rod extending through the head and terminating outside the bolt near said head and being unaffected by elongation of the portion of the shank between the head and said place of attachment and providing a reference outside the bolt for measurement of elongation of the shank between the place of attachment and the head end of the bolt whereby changes of tension loads exerted on the bolt can be determined.

4. A device for determining the amount of relative movement between two points in an assembly of elements after having been assembled therewith and thereby placed initially in tension which comprises an expansion bolt having a head at one end to bear against one side of that assembly, a shank, a thread at the remaining end, an expandable shell to bear against another part of the assembly, and a shell expander nut in said shell and engaged with said thread, said bolt having a bore extending through the head and into the shank, a portion of the shank extending from the head, stopping short of the thread and being of uniform cross-section for elongation in direct proportion to increases in tension load imposed on the bolt after its initial installation with said assembly, a separately-formed, headless test rod in said uniform cross-section shank portion, and means comprising a pin extending transversely through the shank and the rod securing said rod to the said uniform shank portion, said test rod being unaffected by elongation of the portion of the shank between the head and said pin and providing a reference for measurement of elongation of the shank between the pin and the head end of the bolt whereby changes of tension loads exerted on the bolt can be determined.

5. A bolt type fastener comprising an elongated body having a head at one end and a threaded portion at the remaining end, a longitudinal bore in the said body opening at the head end of the body and extending longitudinally of the body toward the threaded portion, a test rod in the bore with one end of the rod at the head end of the body and means securing the test rod to the body at a point distant from the head and the body having a uniform cross-section along the portion thereof between the head and the securing means for elongating relative to the test rod and thereby indicating the tension exerted upon the body by a cooperating member engaged with the threaded portion of the body by the relative movement of the said one end of the rod and the body at the head end thereof, and the said securing means being disposed at a point spaced from the threaded portion of the body and from the end of the threaded portion toward the head whereby the extent of relative movement of the rod at the head end of the body is solely dependent upon the tension exerted upon the rod between the head and the threaded portion thereof.

References Cited in the file of this patent

UNITED STATES PATENTS

| | | |
|---|---|---|
| 305,843 | Pierson | Sept. 30, 1884 |
| 558,658 | McCloskey | Apr. 21, 1896 |
| 1,434,394 | Matthes | Nov. 7, 1922 |
| 2,061,261 | Walter | Nov. 17, 1936 |
| 2,413,797 | Stone | Jan. 7, 1947 |